United States Patent [19]

Takeda et al.

[11] Patent Number: 5,006,590
[45] Date of Patent: Apr. 9, 1991

[54] PROCESS FOR THE PREPARATION OF DISPERSION OF WATER-SOLUBLE CATIONIC POLYMER

[75] Inventors: Hisao Takeda, Zama; Mutsumi Kawano, Chigasaki, both of Japan

[73] Assignee: Kyoritsu Yuki Co., Ltd., Tokyo, Japan

[21] Appl. No.: 414,174

[22] Filed: Sep. 28, 1989

[30] Foreign Application Priority Data

Oct. 14, 1988 [JP] Japan .................................. 63-257277

[51] Int. Cl.$^5$ ................................................ C08F 2/16
[52] U.S. Cl. .................................... 524/458; 526/292.2
[58] Field of Search ...................... 524/458; 526/292.2; 525/293, 297

[56] References Cited

U.S. PATENT DOCUMENTS 4,190,717  2/1980  Suzuki et al. ..................... 526/292.2

FOREIGN PATENT DOCUMENTS 3092800  4/1988  Japan .

Primary Examiner—Joseph L. Schofer
Assistant Examiner—Jeffrey T. Smith
Attorney, Agent, or Firm—Browdy and Neimark

[57] ABSTRACT

The present invention relates to the preparation of a dispersion wherein a copolymer comprising an acrylic monomer containing a dialkylbenzylammonium group is dispersed in an aqueous solution of a salt as fine particle. Two cationic polymers are used in the polymerization of the above monomer in the aqueous solution of a salt. One of the cationic polymers is a (co)polymer comprising an acrylic monomer containing a trialkylammonium group which is soluble both in the aqueous solution of a salt and in water, while the other thereof is a copolymer comprising an acrylic monomer containing a dialkylbenzylammonium group which is soluble in water, but insoluble in the aqueous solution of a salt. The above aqueous solution of a salt is an aqueous solution of a polyvalent anion salt such as sulfate or phosphate. A dispersion of a water-soluble cationic polymer can be prepared by dissolving the above monomer in the aqueous solution and carrying out the polymerization in the presence of the above two polymers.

20 Claims, No Drawings

PROCESS FOR THE PREPARATION OF DISPERSION OF WATER-SOLUBLE CATIONIC POLYMER

BACKGROUND OF THE INVENTION

1. Field of the Invention

The present invention relates to a process for the preparation of a dispersion of a water-soluble cationic polymer which is useful as a flocculant or dehydrating agent for waste water disposal or as a papermakers chemical.

2. Description of the Prior Art

Known processes for the preparation of a water-soluble cationic polymer which is useful as a flocculant for waste water disposal or as a papermakers chemical include standing polymerization in an aqueous solution, water-in-oil emulsion polymerization (see, for example, Japanese Patent Laid-Open No. 102388/1979), suspension polymerization in a hydrophobic solvent (see, for example, Japanese Patent Laid-Open No. 69196/1979) and so on.

Further, there has been disclosed a process for preparing a water-soluble, nonionic or anionic polymer by precipitation polymerization in an aqueous solution of ammonium sulfate (see, for example, Japanese Patent Laid-Open No. 70489/1975).

Also there have been disclosed a process for carrying out the polymerization in an aqueous solution of a salt in the presence of a polyhydric alcohol (see, for example, Japanese Patent Laid-Open No. 20502/1987) and a process for carrying out the polymerization in an aqueous solution of a salt in the presence of a polyelectrolyte as a dispersant (see, for example, Japanese Patent Laid-Open Nos. 123610/1986 and 20511/1987).

The standing polymerization in an aqueous solution, however, must be carried out with a monomer concentration of at least 10% by weight in order to obtain a high-molecular weight polymer. Therefor, the product is given in a state of water-containing gel, so that it is difficult to dissolve the product as such. Accordingly, the product must be put on the market in a state of a low-concentration solution obtained by further diluting a product or must be dried and powdered. With respect to the low-concentration solution, the transportion cost is disadvantageously enhanced, while with respect to the powdering of the product, much heat energy is necessitated for drying the product and the product disadvantageously causes three-dimensional crosslinking by heating to insolubilize a part thereof.

Meanwhile, the water-in-oil emulsion polymerization has a problem that a flammable and valuable organic solvent is consumed wastefully. Further, the suspension polymerization in a hydrophobic solvent has a problem that the production equipment costs a great deal, because a flammable material such as cyclohexane or toluene is used. The precipitation polymerization in an aqueous solution of ammonium sulfate has a problem that the formed polymers adhere to each other to form big lumps, resulting in difficult handling, though it is a preferable method with a low cost of equipment. Furthermore, it is difficult to prepare a polymer in a state of fine particle by using a conventional dispersant.

SUMMARY OF THE INVENTION

An object of the present invention is to solve the above problems. More precisely, the present invention relates to a process for dispersing a water-soluble cationic polymer in an aqueous solution of a polyvalent anion salt in a state of fine particle. In other words, it aims at providing a process for the preparation of a dispersion of a water-soluble cationic polymer which is easily flowable and easily soluble in spite of its high molecular weight.

Another object of the present invention is to provide a process for the preparation of a dispersion of a water-soluble cationic polymer which comprises polymerizing a water-soluble monomer mixture containing at least 5 mole % of a cationic monomer represented by the general formula (I) in an aqueous solution of a polyvalent anion salt, characterized in that the polymerization is carried out in the presence of both a water-soluble cationic polymer which is insoluble in said aqueous solution of a polyvalent anion salt and a water-soluble cationic polymer which is soluble in said aqueous solution of a polyvalent anion salt, that said water-soluble cationic polymer insoluble in the aqueous solution of a polyvalent anion salt contains at least 5 mole % of cationic monomer units represented by the general formula (I) and that said water-soluble cationic polymer soluble in the aqueous solution of a polyvalent anion salt contains at least 20 mole % of cationic monomer unit represented by the general formula (II).

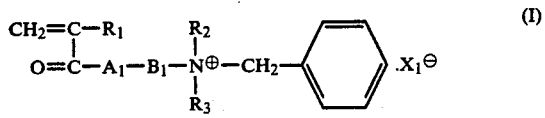

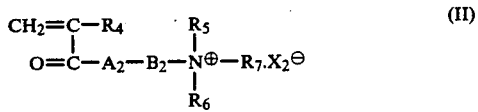

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each an alkylene group having 2 to 4 carbon atoms or a hydroxypropylene group and $X_1^\ominus$ and $X_2^\ominus$ are each a counter anion.

A still further object of the present invention is to provide a process for the preparation of a dispersion of a water-soluble cationic polymer which comprises polymerizing a water-soluble monomer mixture containing a cationic monomer represented by the general formula (I) in an aqueous solution of a polyvalent anion salt, characterized in that the formed water-soluble cationic polymer is precipitated in a state of fine particle and that the precipitation of the polymer is controlled so as to give the fine particle of the polymer.

Another object of the present invention is to provide a process for the preparation of a dispersion of a water-soluble cationic polymer, characterized in that, by precipitating a water-soluble cationic polymer in an aqueous solution of a polyvalent anion salt, the viscosity of the formed dispersion is lowered and the separation of the polymer in the aqueous solution is inhibited.

DETAILED DESCRIPTION OF PREFERRED EMBODIMENTS

The process for the preparation of a dispersion of a water-soluble cationic polymer according to the present invention is characterized in that the three components which follow are coexistent at the beginning of the polymerization, though other components may, if necessary, be used additionally:

a water-soluble monomer mixture containing at least 5 mole % of a cationic monomer represented by the general formula (I):

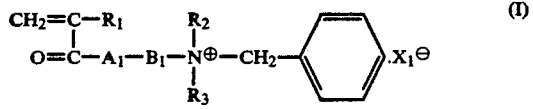

wherein $R_1$ is H or $CH_3$; $R_2$ and $R_3$ are each an alkyl group having 1 to 2 carbon atoms; $A_1$ is an oxygen atom or NH; $B_1$ is an alkylene group having 2 to 4 carbon atoms or a hydroxypropyl group and $X_1^{\ominus}$ is a counter anion, an aqueous solution of a polyvalent anion salt in which the above water-soluble monomer mixture is soluble and the polymer of the monomer mixture is insoluble, and a dispersant comprising a water-soluble cationic polymer insoluble in an aqueous solution of a polyvalent anion salt and a water-soluble cationic polymer soluble in an aqueous solution of a polyvalent anion salt as essential components.

The polyvalent anion salt to be incorporated in the aqueous solution according to the present invention is suitably a sulfate or phosphate and particular examples thereof include ammonium sulfate, sodium sulfate, magnesium sulfate, aluminum sulfate, ammonium hydrogenphosphate, sodium hydrogenphosphate and potassium hydrogenphosphate. In the present invention, these salts may be each used as an aqueous solution thereof having a concentration of 15% or above.

The above cationic monomer represented by the general formula (I) includes quaternary ammonium salts obtained by the reaction of benzyl chloride with dimethylaminoethyl (meth)acrylate, diethylaminoethyl (meth)acrylate, dimethylaminohydroxypropyl (meth)acrylate or dimethylaminopropyl (meth)acrylamide. The monomer to be copolymerized with the cationic monomer represented by the general formula (I) includes (meth)acrylamide and cationic monomers represented by the general formula (II).

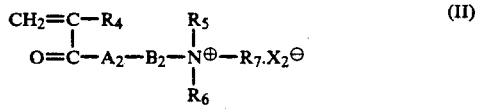

wherein $R_4$ is H or $CH_3$; $R_5$ and $R_6$ are each an alkyl group having 1 to 2 carbon atoms; $R_7$ is H or an alkyl group having 1 to 2 carbon atoms; $A_2$ is an oxygen atom or NH; $B_2$ is an alkylene group having 2 to 4 carbon atoms or a hydroxypropylene group and $X_2^{\ominus}$ is a counter anion.

Among the cationic monomers represented by the general formula (II), salts and methylated quaternary salts of dialkylaminoethyl (meth)acrylate are particularly preferred.

The cationic monomer represented by the general formula (II) is so highly hydrophilic that the excess use thereof hinders the precipitation of the generated polymer. Accordingly, the mol fraction of the cationic monomer represented by the general formula (II) must not exceed that of the monomer represented by the general formula (I). The polymerization concentration thereof is suitably selected in a range of 5 to 30% by weight.

Of the two polymers to be added before the beginning of the polymerization for the purpose of obtaining a fine dispersion, the water-soluble cationic polymer insoluble in an aqueous solution of a polyvalent anion salt is preferably a product prepared by the process for the preparation of a water-soluble cationic polymer according to the present invention, which is because the dispersion prepared according to the present invention is easily handlable owing to its low viscosity (as compared with a case of adding the polymer as a viscous solution).

The monomer composition of the polymer to be added need not always be equal to that of the objective polymer.

Meanwhile, the water-soluble cationic polymer soluble in an aqueous solution of a polyvalent anion salt which is the other polymer is a cationic polymer comprising at least 20 mole % of a cationic monomer represented by the general formula (II) and the balance of (meth)acrylamide. These two polymers are each added in an amount of 1 to 10% by weight based on the total amount of the monomers used. The coexistence of a polyhydric alcohol such as glycerin or polyethylene glycol often further improves the state of precipitation.

The polymerization according to the present invention is carried out by the use of a conventional water-soluble free-radical initiator. It is particularly preferable to use a water-soluble azo compound such as 2,2'-azobis(2-amidinopropane) hydrochloride or 2,2'-azobis(N,N-dimethyleneisobutyramidine) hydrochloride. The additional dissolution of various salts in the polymer dispersion after the completion of the polymerization is effective in lowering the viscosity of the polymer dispersion and in making the specific gravity of the aqueous solution equal to that of the polymer particle. It is preferable from the standpoint of workability that the viscosity of the dispersion be 1000 cP or below, while it is effective in inhibiting the separation of the polymer that the polymer particle and the aqueous solution have specific gravities equal to each other.

The process for the preparation of a dispersion of a water-soluble cationic polymer according to the present invention is characterized in that the polymerization is carried out in an aqueous solution of a polyvalent anion salt to precipitate the generated water-soluble cationic polymer and that the precipitation is controlled so as to give the fine particle of the polymer. In this connection, the precipitation of a polymer with an aqueous solution of a polyvalent anion salt is a known phenomenon which is easily illustrated based on the Hofmeister's series.

In the process for the preparation of a dispersion of a water-soluble cationic polymer according to the present invention, the benzyl group-containing cationic monomer unit represented by the general formula (I) is particularly easily salted out and an amide group is next easily salted out. The mechanism as to how the two polymers are added as dispersants and exhibit the effects is presumably that a suitable polymerization field is provided and the association is hindered by an electrical repulsive force, though it is not apparent. Particularly, a water-soluble cationic polymer insoluble in an aqueous solution of a polyvalent anion salt exhibits such complicated behavior as the dissolution thereof in the aqueous solution in the presence of the monomers.

EXAMPLE

Examples of the process for the preparation of a dispersion of a water-soluble cationic polymer according to the present invention will now be described, though the present invention is not limited to the following Examples, but includes all embodiments as far as they are not deviated from the scope of the technical idea constituted of the matters described in the claim. Example 1

2.5 g of an acryloyloxyethyldimethylbenzylammonium chloride-acrylamide copolymer having a degree of cationization of 10 mole %, 2.5 g of polyacryloyloxyethyltrimethylammonium chloride, 335 g of ion-exchanged water, 112.5 g of ammonium sulfate, 35.1 g of acrylamide and 14.9 g of acryloyloxyethyldimethylbenzylammonium chloride were placed in a 1 l five-necked separable flask fitted with a stirrer, a thermometer, a reflux condenser and a nitrogen inlet tube. The resulting system was purged with nitrogen. 1 ml of a 1% aqueous solution of 2,2'-azobis(2-amidinopropane) hydrochloride was added to the flask to carry out the polymerization at a bulk temperature of 50° C. for 10 hours. The particle size of the polymer in the obtained dispersion was 10 μm or below and the viscosity of the dispersion was 500 cP.

Comparative Example 1

335 g of ion-exchanged water, 112.5 g of ammonium sulfate, 35.1 g of acrylamide and 14.9 g of acryloyloxyethyldimethylbenzylammonium chloride were placed in the same five-necked separable flask as that used in Example 1. The resulting system was purged with nitrogen. 1 ml of a 1% aqueous solution of 2,2'-azobis(2-amidinopropane) hydrochloride was added to the flask to carry out the polymerization at a bulk temperature of 50° C. for 10 hours. The particle size of the obtained polymer was 2 to 3mm and the polymer immediately settled out.

Example 2

17.5 kg of ion-exchanged water, 5 kg of ammonium sulfate, 3.2 kg of acrylamide, 1.33 kg of acryloyloxyethyldimethylbenzylammonium chloride, 1.1 kg of a 20% aqueous solution of polyacryloyloxyethyltrimethylammonium chloride and 1.5 kg of the polymer dispersion prepared in Example 1 were placed in a 35 l jacketed reaction vessel made of stainless steel and fitted with an agitating blade of a ribbon type. The resulting system was purged with nitrogen. 1 g of 2,2'-azobis(2-amidinopropane) hydrochloride was added to the vessel to carry out the polymerization at a bulk temperature of 50° C. for 10 hours. The particle size of the polymer in the obtained dispersion was 10 μm or below and the viscosity of the dispersion was 2500 cP. 1.3 kg of ammonium sulfate was further added to the dispersion. The viscosity of the resulting dispersion was 230 cP, though the particle size was unchanged.

Comparative Example 2

17.5 kg of ion-exchanged water, 5 kg of ammonium sulfate, 3.2 kg of acrylamide, 1.33 kg of acryloyloxyethyldimethylbenzylammonium chloride and 1.1 kg of a 20% aqueous solution of polyacryloyloxyethyltrimethylammonium chloride were placed in the same reaction vessel as that used in Example 2. The resulting system was purged with nitrogen. 1 g of 2,2'-azobis(2-amidinopropane) hydrochloride was added to the reaction vessel to carry out the polymerization at a bulk temperature of 50° C. for 10 hours. The particle size of the polymer in the obtained dispersion was 100 μm.

Example 3

15.7 kg of ion-exchanged water, 4.6 kg of ammonium sulfate, 2.1 kg of acrylamide, 3.1 kg of acryloyloxyethyldimethylbenzylammonium chloride, 0.9 kg of acryloyloxyethyltrimethylammonium chloride, 0.1 kg of glycerin, 1.5 kg of a 20% aqueous solution of polyacryloyloxyethyltrimethylammonium chloride and 1.5 kg of the polymer dispersion prepared in Example 1 were placed in the same reaction vessel as that used in Example 2. The resulting system was purged with nitrogen. 1 g of 2,2'-azobis(2-amidinopropane) hydrochloride was added to the reaction vessel to carry out the polymerization at a bulk temperature of 50° C. for 10 hours. The particle size of the polymer in the obtained dispersion was 10 μm or below and the viscosity of the dispersion was 3200 cP. 2.1 kg of ammonium sulfate was further added to the dispersion. The viscosity of the resulting dispersion was 280 cP, though the particle size was unchanged. Comparative Example 3

15.7 kg of ion-exchanged water, 4.6 kg of ammonium sulfate, 2.1 kg of acrylamide, 0.9 kg of acryloyloxyethyltrimethylammonium chloride, 0.1 kg of glycerin and 1.5 kg of a 20% aqueous solution of polyacryloyloxyethyltrimethylammonium chloride were placed in the same reaction vessel as that used in Example 2. The resulting system was purged with nitrogen. 1 g of 2,2'-azobis(2-amidinopropane) hydrochloride was added to the reaction vessel at a bulk temperature of 50° C. for 10 hours. The particle size of the polymer in the obtained dispersion was about 100 μm. Example 4

17.0 kg of ion-exchanged water, 4.2 kg of ammonium sulfate, 0.4 kg of acrylamide, 3.9 kg of acryloyloxyethyldimethylbenzylammonium chloride, 1.7 kg of acryloyloxyethyltrimethylammonium chloride and 2.5 kg of a 20% aqueous solution of polyacryloyloxyethyltrimethylammonium chloride were placed in the same reaction vessel as that used in Example 2, followed by the addition of 2.5 kg of a fine dispersion of an acrylamide-acryloyloxyethyldimethylbenzylammonium chloride copolymer having a degree of cationization of 80 mole % (containing 20% by weight of the copolymer and 20% by weight of ammonium sulfate). The resulting system was purged with nitrogen. 1 g of 2,2'-azobis(N,N'-dimethyleneisobutyramidine) hydrochloride was added to the reaction vessel to carry out the polymerization at a bulk temperature of 45° C. for 10 hours. After the completion of the polymerization, 0.5 kg of ammonium chloride was added to the reaction vessel. The particle size of the polymer in the obtained dispersion was about 10 μm or below and the viscosity of the dispersion was 400 cP.

Comparative Example 4

17.0 kg of ion-exchanged water, 4.2 kg of ammonium sulfate, 0.4 kg of acrylamide, 3.9 kg of acryloyloxyethyldimethylbenzylammonium chloride, 1.7 kg of acryloyloxyethyltrimethylammonium chloride and 2.5 kg of a 20% aqueous solution of polyacryloyloxyethyltrimethylammonium chloride were placed in the same reaction vessel as that used in Example 2. The resulting system was purged with nitrogen. 1 g of 2,2'-azobis(N,N'-dimethyleneisobutyramidine) hydrochloride was added to the reaction vessel to carry out the polymerization at a bulk temperature of 45° C. for 10 hours. After the completion of the polymerization, 0.5 kg of ammonium chloride was added to the vessel, followed by mixing. The particle size of the polymer in the obtained dispersion was about 100 μm.

Example 5

18.3 kg of ion-exchanged water, 1.5 kg of anhydrous sodium sulfate, 3.5 kg of anhydrous aluminum sulfate, 3.1 kg of acrylamide, 1.4 kg of acrylamidopropyldimethylbenzylammonium chloride, 1 kg of a 20% aqueous solution of polyacrylaminopropyltrimethylammonium chloride and 0.2 kg of an acrylamidopropyldimethylbenzylammonium chlorideacrylamide copolymer having a degree of cationization of 10 mole % were placed in the same reaction vessel as that used in Example 2. The resulting system was purged with nitrogen. 1 g of 2,2'-azobis(2-amidinopropane) hydrochloride was added to the vessel to carry out the polymerization at a bulk temperature of 50° C. for 10 hours. The particle size of the polymer in the obtained dispersion was 10 μm or below and the viscosity of the dispersion was 3000 cP. 1 kg of sodium chloride was added to the dispersion. The viscosity of the resulting dispersion was 780 cP, though the particle size was unchanged.

Comparative Example 5

18.3 kg of ion-exchanged water, 1.5 kg of anhydrous sodium sulfate, 3.5 kg of anhydrous aluminum sulfate, 3.1 kg of acrylamide, 1.4 kg of acrylamidopropyldimethylbenzylammonium chloride and 1 kg of a 20% aqueous solution of polyacrylamidopropyltrimethylammonium chloride were placed in the same reaction vessel as that used in Example 2. The resulting system was purged with nitrogen. 1 g of 2,2'-azobis(2-amidinopropane) hydrochloride was added to the reaction vessel to carry out the polymerization at a bulk temperature of 50° C. for 10 hours. The particle size of the polymer in the obtained dispersion was 100 μm.

What is claimed is:

1. A process for preparing a dispersion of a water-soluble cationic polymer that is easily flowable and easily soluble in spite of its high molecular weight comprising: polymerizing a water-soluble monomer mixture containing at least 5 mole % of a cationic monomer represented by general formula (I) in an aqueous solution of a polyvalent anion salt, wherein said polymerization is carried out in the presence of:
   (1) a water-soluble cationic polymer which is insoluble in said aqueous solution of a polyvalent anion salt; and
   (2) a water-soluble cationic polymer which is soluble in said aqueous solution of a polyvalent anion salt, said water-soluble cationic polymer insoluble in said aqueous solution of polyvalent anion salt contains at least 5 mole % of cationic monomer units represented by following general formula (I) and said water-soluble cationic polymer soluble in said aqueous solution of a polyvalent anion salt contains at least 20 mole % of cationic monomer units represented by the following general formula (II):

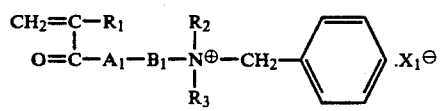

(I)

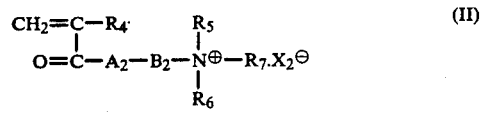

(II)

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each to 4 carbon atoms or a hydroxypropylene group and $X_1-$ and $X_2-$ are each a counter anion.

2. A process for the preparation of a dispersion of a water-soluble cationic polymer as set forth in claim 1, wherein said water-soluble cationic polymer insoluble in an aqueous solution of a polyvalent anion salt and said water-soluble cationic polymer soluble in an aqueous solution of a polyvalent anion salt are each used in an amount of 1 to 10% by weight based on the amount of the water-soluble monomer mixture.

3. A process for the preparation of a dispersion of a water-soluble cationic polymer as set forth in claim 2, wherein the cationic monomer represented by the general formula (II) is one selected from among dimethylaminoethyl(meth)acrylate, dimethylaminopropyl(meth)acrylamide, salts and methylated quaternary ammonium salts of dimethylaminohydroxypropyl(meth)acrylate and mixtures of them.

4. A process for the preparation of a dispersion of a water-soluble cationic polymer as set forth in claim 2, wherein the cationic monomer represented by the general formula (II) is (meth)acryloyloxyethyltrimethylammonium chloride.

5. A process for the preparation of a dispersion of a water-soluble cationic polymer as set forth in claim 1, wherein said water-soluble cationic polymer insoluble in an aqueous solution of a polyvalent anion salt comprises at least 5 mole % of cationic monomer units represented by the general formula (I) and the balance of one-member selected from among (meth)acrylamide, cationic monomers represented by the general formula (II) and mixtures thereof.

6. A process for the preparation of a dispersion of a water-soluble cationic polymer as set forth in claim 1, wherein the monomer units constituting said water-soluble cationic polymer soluble in an aqueous solution of a polyvalent anion salt are all represented by the general formula (II).

7. A process for the preparation of a dispersion of a water-soluble cationic polymer as set forth in claim 1, wherein said cationic monomer represented by the general formula (I) is one selected from among dimethylaminoethyl(meth)-acrylate, dimethylaminohydroxypropyl(meth)acrylate, benzylated quaternary ammonium salts of dimethylaminopropylacrylamide and mixture thereof.

8. A process for the preparation of a dispersion a water-soluble cationic polymer as set forth in claim 1, wherein said cationic monomer represented by the general formula (I) is (meth)acryloyloxyethyldimethylbenzylammonium chloride.

9. A process for the preparation of a dispersion of a water-soluble cationic polymer as set forth in claim 1, wherein the water-soluble cationic polymer insoluble in an aqueous solution of a polyvalent anion salt is added to the monomer solution in a state dispersed in an aqueous solution of a polyvalent anion salt as fine particle.

10. A process for the preparation of a dispersion of a water-soluble cationic polymer as set forth in claim 1, wherein the polyvalent anion salt concentration of the aqueous solution is 15% by weight or above.

11. A process for the preparation of a dispersion of a water-soluble cationic polymer as set forth in claim 1, wherein said polyvalent anion salt is one selected from among sulfates, phosphates and mixtures thereof.

12. A process for the preparation of a dispersion of a water-soluble cationic polymer as set forth in claim 1, wherein said polyvalent anion salt is a sulfate.

13. A process for the preparation of a dispersion of a water-soluble cationic polymer as set forth in claim 1, wherein said polyvalent anion salt is ammonium sulfate.

14. A process for the preparation of a dispersion of a water-soluble cationic polymer as set forth in claim 1, wherein a salt is additionally dissolved in the dispersion after the completion of the polymerization.

15. A process for the preparation of a dispersion of a water-soluble cationic polymer as set forth in claim 1, wherein the specific gravity of the polymer in the dispersion is equal to that of the aqueous solution.

16. A process for the preparation of a dispersion of a water-soluble cationic polymer as set forth in claim 1, wherein the viscosity of the polymer dispersion is 1000 cP or below.

17. A process for the preparation of a dispersion of a water-soluble cationic polymer as set forth in claim 1, wherein the water-soluble monomer concentration based on the total amount of the aqueous solution is 5 to 30% by weight.

18. A process for the preparation of a dispersion of a water-soluble cationic polymer as set forth in claim 1, wherein a water-soluble azo free-radical initiator is used as a polymerization initiator.

19. A process for the preparation of a dispersion of a water-soluble cationic polymer as set forth in claim 1, wherein the polymerization initiator is one selected from among 2,2'-azobis(2-amidinopropane) hydrochloride, 2,2'-azobis(N,N'-dimethyleneisobutyramidine) hydrochloride and mixture thereof.

20. A process for the preparation of a dispersion of a water-soluble cationic polymer as set forth in claim 1, wherein the particle size of the polymer is 10 μm or below.

* * * * *